United States Patent
Kostenick, Jr. et al.

(10) Patent No.: US 7,174,796 B2
(45) Date of Patent: Feb. 13, 2007

(54) TOOL EVALUATION SYSTEM AND METHOD

(75) Inventors: Paul G. Kostenick, Jr., Everett, WA (US); Arlen R. Pumphrey, Lynnwood, WA (US); Albert H. Cha, Auburn, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/294,593

(22) Filed: Dec. 6, 2005

(65) Prior Publication Data

US 2006/0081074 A1 Apr. 20, 2006

Related U.S. Application Data

(62) Division of application No. 10/448,220, filed on May 30, 2003, now Pat. No. 6,971,273.

(51) Int. Cl.
    *G01L 1/00* (2006.01)
(52) U.S. Cl. ............... 73/862.541; 73/788; 73/818
(58) Field of Classification Search ............ 73/865.9, 73/862.541, 788, 818; 72/21.4, 20.1
    See application file for complete search history.

(56) References Cited

U.S. PATENT DOCUMENTS

| | | | |
|---|---|---|---|
| 3,675,517 A | * | 7/1972 | Tadayoshi .............. 82/118 |
| 3,827,293 A | | 8/1974 | Hohberger |
| 4,640,117 A | | 2/1987 | Anderson et al. |
| 4,713,770 A | * | 12/1987 | Hayes et al. .............. 700/175 |
| 4,838,085 A | | 6/1989 | Pellerin et al. |
| 4,899,594 A | | 2/1990 | Wolfer et al. |
| 4,967,127 A | | 10/1990 | Ishiguro et al. |
| 5,421,101 A | | 6/1995 | Rank |
| 5,467,656 A | * | 11/1995 | Teare et al. .............. 73/862.541 |
| 5,596,800 A | | 1/1997 | Holliday et al. |
| 5,734,113 A | | 3/1998 | Vogt et al. |
| 6,212,924 B1 | | 4/2001 | Meisser |
| 6,418,769 B1 | | 7/2002 | Schreiner |
| 6,505,494 B1 | | 1/2003 | Wollermann |
| 6,533,507 B2 | | 3/2003 | Sailing |

* cited by examiner

*Primary Examiner*—Hezron Williams
*Assistant Examiner*—Nashmiya Fayyaz
(74) *Attorney, Agent, or Firm*—Baker & Hostetler LLP

(57) ABSTRACT

A tool is evaluated in response to a member of the tool being moved from a first position to a second position. In this evaluation, a first force is applied to the member. The first force is operable to move the member from the first position to the second position. In addition, a second force is sensed. This second force results from a resistance of the tool to the first force. Furthermore, it is determined whether the second force exceeds a predetermined value.

8 Claims, 5 Drawing Sheets

TOOL EVALUATION SYSTEM AND METHOD

CROSS-REFERENCE TO RELATED APPLICATIONS

This application claims priority to and is a divisional of U.S. patent application entitled, TOOL EVALUATION SYSTEM AND METHOD, filed May 30, 2003, having a Ser. No. 10/448,220, now U.S. Pat. No. 6,971,273 the disclosure of which is hereby incorporated by reference in its entirety.

FIELD OF THE INVENTION

The present invention generally relates to a tool evaluation device. More particularly, the present invention pertains to a tool evaluation system and method of evaluating a tool.

BACKGROUND OF THE INVENTION

It is generally accepted that tools are utilized to facilitate a multitude of operations in various manufacturing and construction industries. Often, tools are configured to facilitate a particular task. Examples of essentially dedicated tools include wire strippers, pop riveters, cutters, and crimping tools. With regard to crimping tools, the term "crimping" generally refers to the production of a mechanical and/or electrical connection which remains essentially unchanged qualitatively over a long period of time. This connection is typically formed between a conductor, such as a wire, and a contact or fastener. During the crimping operation, the material to be connected is permanently plastically deformed. Poorly conducting surface layers, if present, are broken up, which promotes electrical conductivity. A correct crimping also prevents the ingress of corrosive media under operational conditions such as temperature change or vibration. Other terms which may be used to describe the crimping process include expressions such as pressing, squeezing, fixing or attaching.

In relatively high technology industries, such as the aerospace industry, it is important that each tool perform its function with a high degree of precision. In this regard, these tools often include a "lock-out" or other such safety mechanism configured to facilitate correct usage. For example, a known crimping tool or "crimper" includes a ratcheting mechanism having a pawl that clicks into a series of detents. Once a crimping operation has begun, the ratcheting mechanism substantially prevents removal of the wire and fastener until the pawl has advanced to the last detent. Unfortunately, if the crimper is worn or defective, the lock-out mechanism may not ensure a proper crimp and a connection having undesirable material and/or electrical properties may result.

Accordingly, it is desirable to provide a method and apparatus capable of overcoming the disadvantages described herein at least to some extent.

SUMMARY OF THE INVENTION

The foregoing needs are met, to a great extent, by the present invention, wherein in one respect an apparatus and method is provided that in some embodiments evaluates a tool as to whether a sufficient amount of force or work has been imparted upon the tool to facilitate proper function of the tool.

An embodiment of the present invention pertains to a tool evaluator for evaluating a tool in response to movement of a member of the tool. This tool evaluator includes an actuator configured to apply a force to the member, a controller operably connected to the actuator and the configured to modulate the actuator, and a first sensor configured to sense a resistance to the force and transmit a force measurement to the controller. In addition, the controller is configured to determine whether the force measurement is relatively greater than a predetermined threshold value.

Another embodiment of the present invention pertains to an apparatus for evaluating a tool in response to a member of the tool being moved from a first position to a second position. This apparatus includes a means for applying a first force to the member. This first force is operable to move the member from the first position to the second position. In addition, the apparatus includes a means for sensing a second force. This second force results from a resistance of the tool to the first force. The apparatus further includes a means for determining whether the second force exceeds a predetermined value.

Yet another embodiment of the present invention relates to a method of evaluating a tool in response to a member of the tool being moved from a first position to a second position. In this method, a first force is applied to the member. The first force is operable to move the member from the first position to the second position. In addition, a second force is sensed. This second force results from a resistance of the tool to the first force. Furthermore, it is determined whether the second force exceeds a predetermined value.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT

The present invention provides a tool evaluation device and method. In some embodiments, the invention provides for a tool evaluator for evaluating a tool in response to movement of a member of the tool. For example, tools often include one or more handles (members). This tool evaluator includes an actuator configured to apply a force to the member. In general, an actuator is a mechanical device for moving or exerting force. The tool evaluator further includes a controller to control movement of the actuator or modulate the actuator. Moreover, the tool evaluator includes a sensor, such as a load sensor, configured to sense a resistance to the force and transmit a force measurement to the controller. In addition, the controller is configured to determine whether the force measurement is relatively greater than a predetermined threshold value. This threshold value typically indicates that the tool is performing within acceptable parameters. The threshold value may be empirically determined or provided by the tool's manufacturer.

Another embodiment in accordance with the present invention provides a method of evaluating the tool. In this method, a first force is applied to the member of the tool. The first force is operable to move the member from the first position to the second position. In addition, a second force is sensed. This second force results from a resistance of the tool to the first force. Furthermore, it is determined whether the second force exceeds a predetermined value.

Advantages of various embodiments of the invention include, for example: (1) evaluating a tool for proper function according to the tool manufacturers' specification; (2) determining amount of work imparted on to a work product; (3) maintaining a log of tool performance; and (4) ability to anticipate useful life of the tool.

Figure 1:
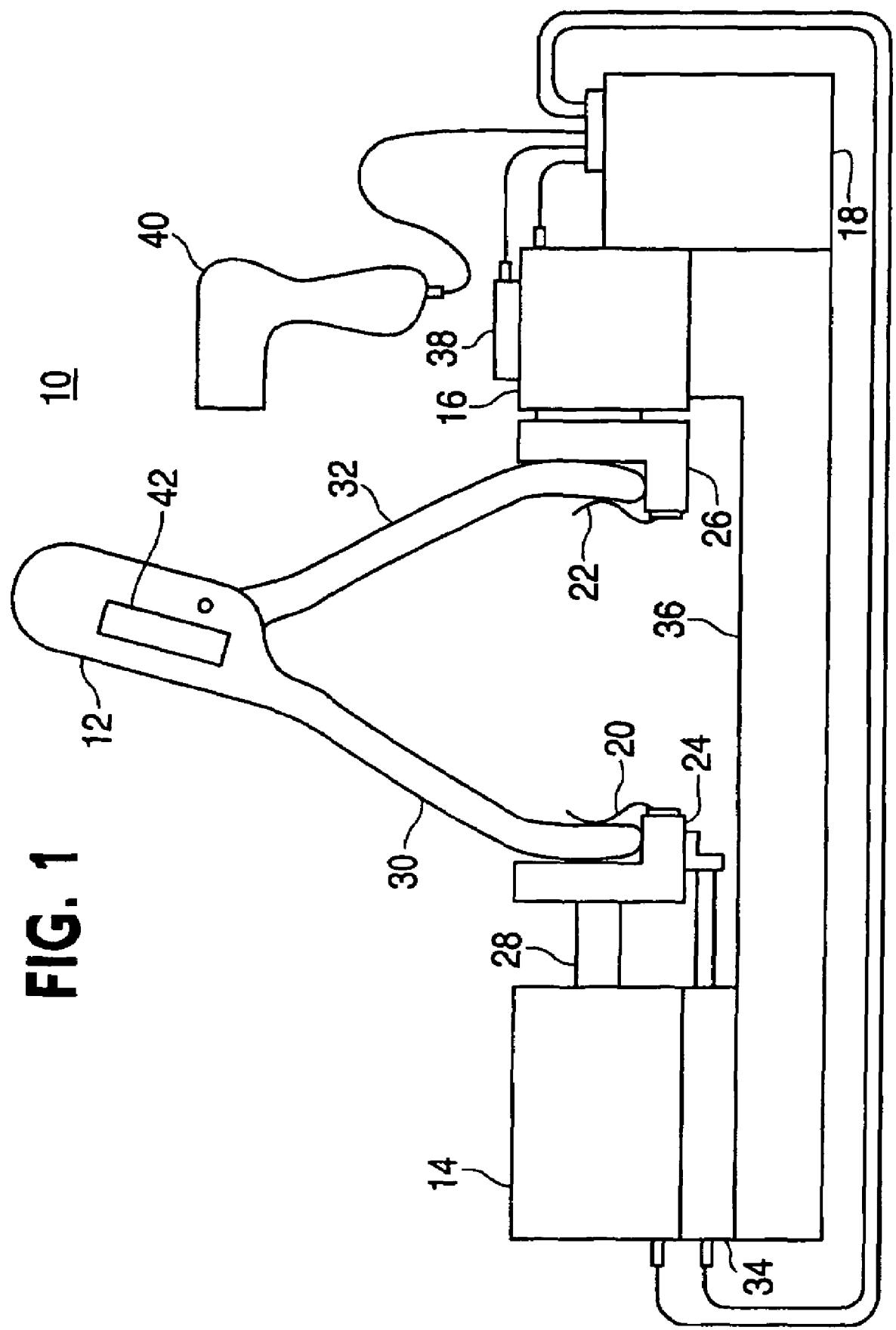
FIG. 1 is a tool evaluating device according to an embodiment of the invention.

The invention will now be described with reference to the drawing figures, in which like reference numerals refer to like parts throughout. As shown in FIG. 1, a tool evaluating device 10 ("evaluator") is configured to test a tool 12 disposed between an actuator 14 and a load sensor 16. In various embodiments of the invention, the actuator 14 may include, for example, a pneumatic piston driven ram, electromagnetic ram, electric servomotor, or the like. To modulate or control the actuator 16, the evaluator 10 includes a controller 18. The load sensor 16 may include various load or pressure sensing devices, such as a load cell, pressure transducer, or the like. In this regard, the load sensor 16 is configured to sense changes in force or pressure and relay this information to the controller.

Optionally, the tool 12 may be held in place by at least one clip, such as clips 20 and 22. If present, these clips 20 and 22 are preferably attached to a plurality of respective rests 24 and 26. The rest 24 is attached to a shaft 28 of the actuator 14 and configured to provide a surface to bear against a member 30 of the tool 12. The rest 26 is configured to provide a bearing surface on to which a member 32 of the tool 12 may thrust against. The rest 26 is connected to the load sensor 16 and further configured to convey the thrust to the load sensor 16.

In addition, the evaluator 10 may include a position sensor 34 configured to sense the position and/or linear travel of the rest 24 and relay this positional information to the controller 18. For example, the position sensor 34 may include a linear potentiometer. However, in another embodiment of the invention, the attributes of the position sensor 34 and actuator 14 may be subsumed within a single device. For example, an electric servomotor generally includes actuating and position sensing capabilities.

The evaluator 10 further includes a base 36 operable to provide a substantially rigid platform on to which the various other components of the evaluator 10 are mounted.

Depending upon the tool 12 to be tested, the evaluator 10 may include a click sensor 38 operable to sense "clicks" emitted by and/or through the tool 12. For example, vibration through the tool 12 and/or a pressure wave generated by vibration of the tool 12 may be sensed by an accelerometer, a microphone, and/or the like. The click sensor 38 is configured to relay the auditory and/or vibrational measurements to the controller 18. Moreover, the evaluator 10 may, optionally, include a scanning device (scanner) 40 configured to sense an identification mark and/or device ("ID") 42 of the tool 12. This ID 42, if present, may be in the form of a Universal Product Code (UPC)/European Article Number (EAN) bar code, a radio frequency (RF) tag, or the like. Accordingly, depending upon the tool 12 to be tested, the scanner 40 may be configured to sense the various ID forms.

In operation, the evaluator 10 is configured to test the tool 12 by modulating the tool 12 in a manner substantially similar to that experienced in actual use. For example, a hand tool may be configured to perform a function as a result of two handles being moved from an open to a closed position. Accordingly, to test this hand tool, the two handles may be driven one towards the other. However, depending upon manufactures specifications, the tool 12 may or may not actually perform its function during the test. That is, in the specific example of a crimper, depending upon the manufacturers specification regarding the crimper, a crimped connection between a wire and a connector may or may not be performed in order to test the tool.

It is to be noted that the conformation of the various elements of the evaluator 10 is not critical and may be altered to suit the particular tool being tested. For example, the load sensor 16 need not be disposed to be thrust upon by the member 32, but rather, the load sensor 16 may be located in any suitable position operable to sense resistance of the tool 12 to pressure applied by the actuator 14. In this regard, specific examples of alternative arrangements include the load sensor 16 being disposed between the actuator 14 and the member 30 and/or between the actuator 14 and the base 36. However, other arrangement may be suitable, again, depending upon the particular tool being tested. Similarly, the arrangement of other elements of the evaluator 10, such as the click sensor 38 and the position sensor 34 may be altered in any suitable manner.

Figure 2:
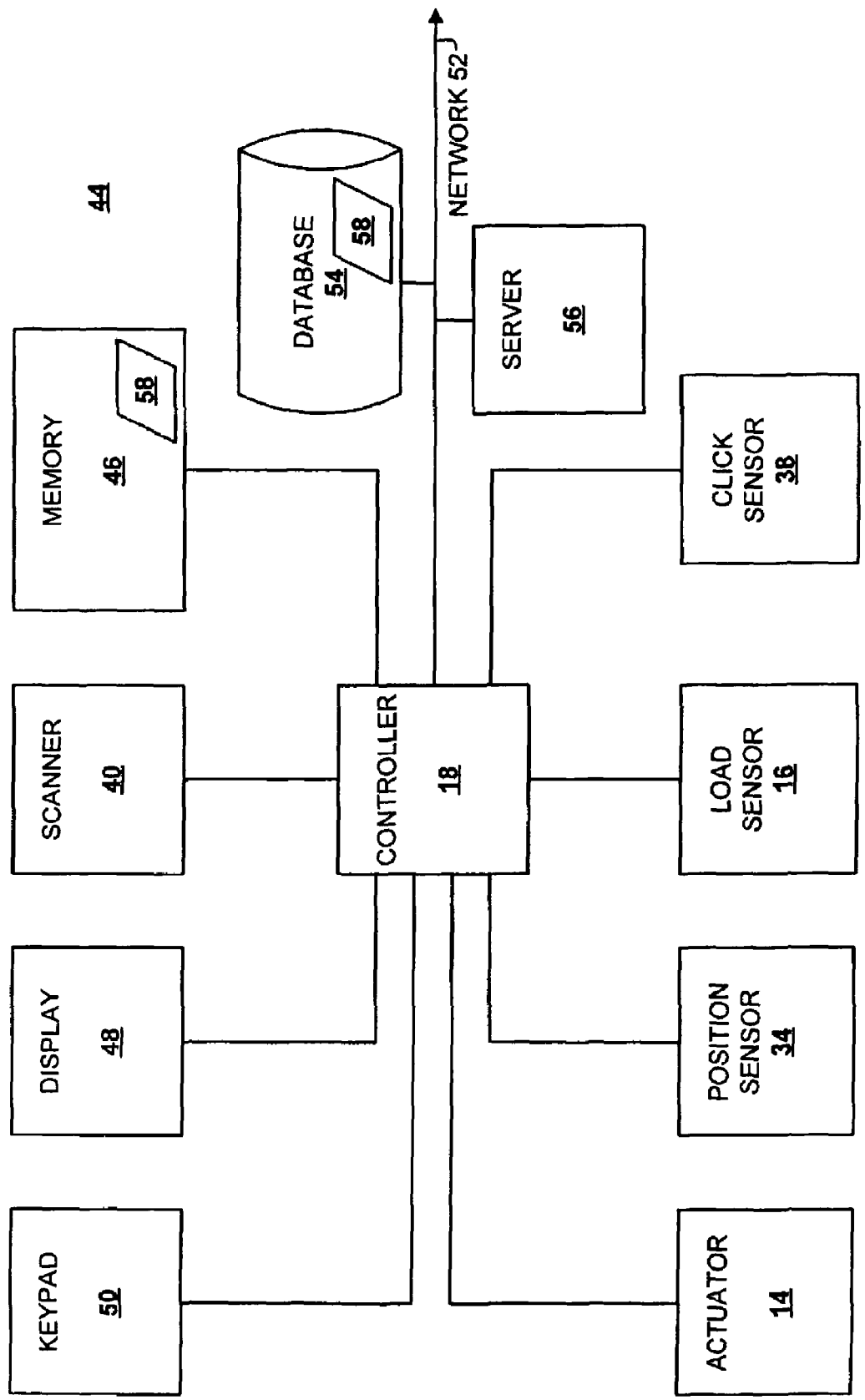
FIG. 2 is a system architecture for a tool evaluating system according to an embodiment of the invention.

FIG. 2 is an illustration of a system architecture for a tool evaluating system (TES) 44 according to an embodiment of the invention. As shown in FIG. 2, the controller 18 is configured to intercommunicate with the actuator 14, load sensor 16, position sensor 34, click sensor 38, and the scanner 40. In addition, the controller 18 is configured to intercommunicate with a memory 46, a display 48, and a keypad 50. The memory 46 is configured to store data received from the controller 18. For example, the memory may store tool IDs, sensor readings, dates, and the like. The display 48 is configured to provide visual information to a user. In another form, the display 48 may include a touch screen configured to provide a data entry capacity to the user. The keypad 50 may, optionally, be included in the TES 44. If present, the keypad 50 is configured to provide a data entry capacity to the user.

Furthermore, in various embodiments of the invention, the TES 44 may include a network 52 configured to intercommunicate with the controller 18. The network 52 may include, for example, a database 54, server 56, and a multitude of other networked devices. In this regard, the network 52 may include a local area network (LAN), wide area network (WAN), wireless network, the Internet, and the like.

Moreover, the TES 44 may include at least one table 58. This table 58 may be stored to the memory 46 and/or the database 54. The table 58 may be configured to store data relating to testing of the tool 12. For example, data stored to the table 58 may include the ID 42, time stamp, time, date, force, work, clicks or other events, and the like. This data may be stored to the table 58 in the form of one or more entries, for example. These entries may be configured to associate and store various measurements sensed at a particular increment of the testing procedure described in FIG. 3. For example, each measurement sensed may include an associated timestamp. In this manner, a force profile over time may be generated in response to the table 58. In addition, as the tool 12 is subjected to a plurality of tests, such as the evaluation described herein, measurements collected during these tests may be retained in the table 58. In this manner, the performance of the tool 12 over days, weeks, and months, for example, may be evaluated and a performance trend may be extrapolated. This performance trend may be utilized to facilitate maintenance or retirement of the tool 12 prior to failure of the tool 12.

Figure 3:
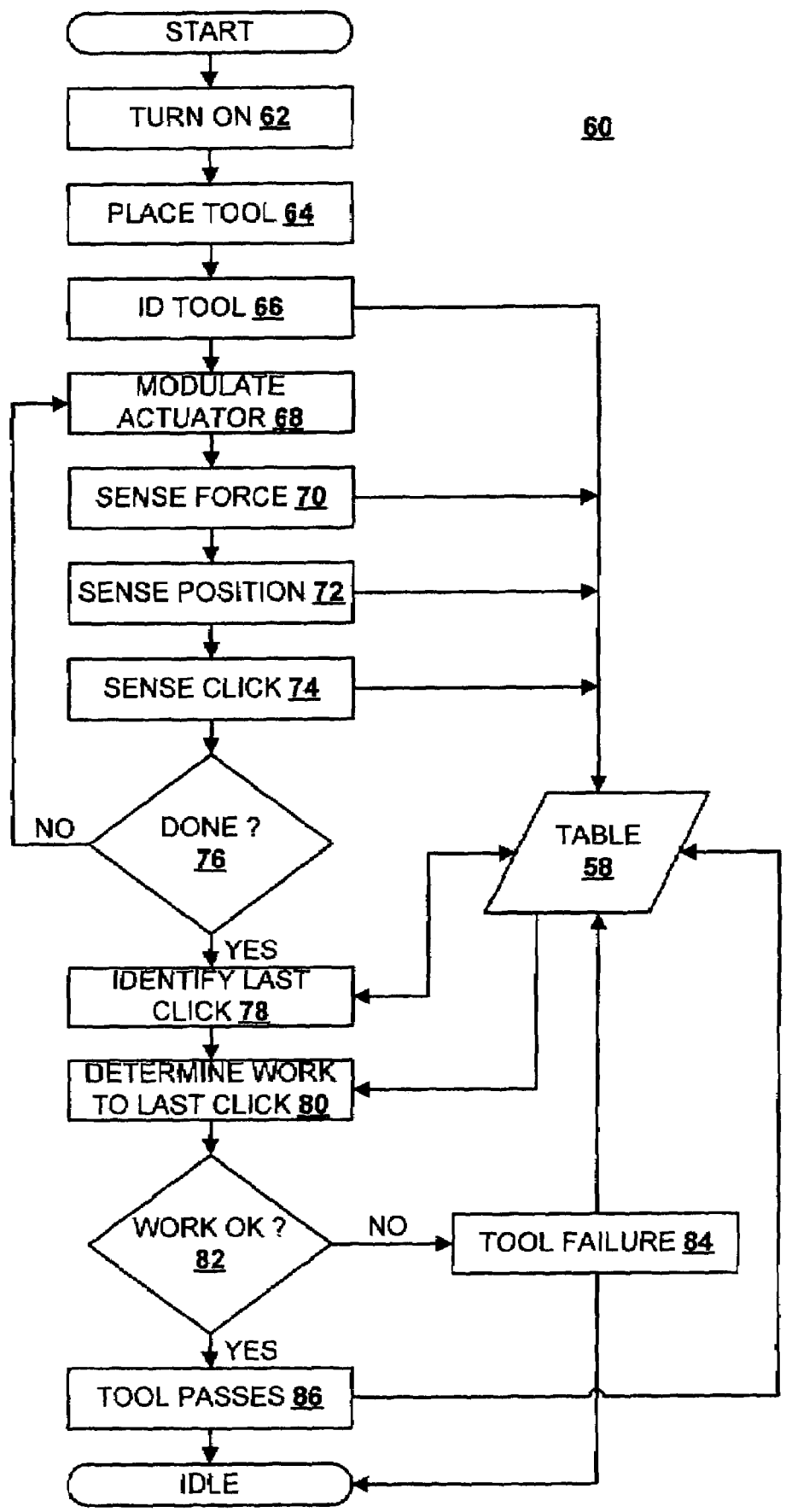
FIG. 3 is a flow diagram according to an embodiment of the invention.

FIG. 3 is a flow diagram of a method 60 according to an embodiment of the invention. As shown in FIG. 3, the method 60 is initiated in response to turning on the TES 44 at step 62 and placing the tool 12 into the evaluator 10 at step 64. At step 66, the tool 12 may be identified. For example, the ID 42 may be sensed by the scanner 40. In addition, the reading for the ID 42 may be utilized to retrieve data associated with the tool 12 from table 58 and/or the database 54. In this manner, any testing history for the tool 12 may be retrieved and compared to data ascertained while performing the method 60. In addition, if the table 58 has not yet been created for the tool 12, at step 66, the table 58 may be generated. Furthermore, the table 58 may be stored to the memory 46 and/or the database 54 at step 66. The following steps 68 to 74 need not proceed in the order presented, but rather, may proceed in any suitable order. Furthermore, some or all of the steps 68 to 74 may occur simultaneously.

At step 68, the tool 12 is modulated in a manner substantially similar to that experienced in actual use. For example, the actuator 14 may be controlled by the controller 18 to press upon the member 30 with a force of $F_c$. In this manner, the $F_c$ applied to the member 30 may be translated through the tool 12 and result in a force of $F_r$ upon the load sensor 16 via the member 32. This $F_r$ upon the load sensor 16 essentially represents the resistance of tool 12 to the $F_c$ against member 30.

At step 70, the $F_r$ or resistance of the tool 12 to the $F_c$ is sensed. For example, the $F_r$ exerted by the member 32 upon the rest 26 is translated to the load sensor 16. As the load sensor 16 is firmly attached to the base 36, the $F_r$ is sensed by the load sensor 16 and relayed to the controller 18. In addition, the $F_r$ forwarded to the controller 18 may be stored to the table 58. Furthermore, a time stamp associated with the $F_r$ may be stored to the table 58. This time stamp may represent a date and time or a time since the beginning of the test, for example.

At step 72, the relative conformation of the tool 12 from an initial conformation to a concluding conformation is sensed. In an embodiment of the invention, a hand crimper is evaluated. This hand crimper includes two handles with an initial conformation of these handles being in an "open" position and a concluding conformation of these handles being in a "closed" position. Thus, in this particular embodiment, the linear position of the rest 24 is measured and the relative position from essentially open to essentially closed is inferred. In addition, the linear position is forwarded to the controller 14 and may be stored to the table 58. A time stamp associated with the linear position sensed may also be stored to the table 58. However, other manners of determining the relative conformation of the tool 12 are within the scope of the invention. For example, an optical system configured to directly sense the conformation of the tool 12 may be utilized. Furthermore, the positional measurement may be compared to an initial position or to any previous position to determine a distance traveled. Similarly, an elapsed time to position may be determined by comparing the time stamps associated with the sensed positions. The distance traveled, the $F_r$, and the elapsed time to position may be utilized to determine an amount of work applied to the tool 12. For example, if the $F_r$ is 500 grams (g) while the position changes 10 centimeters (cm) in 1 second (s), the amount of work performed by the tool 12 is essentially equal to 50,000 erg or $cm^2 * g/s^2$.

At step 74, clicks are, optionally, sensed. In an embodiment of the invention, the tool 12 is a hand crimper including a ratcheted lock-out mechanism having a pawl to engage a series of detents from a first detent to a last detent. Once the pawl has engaged the first detent, it is configured to facilitate forward only movement by locking out reverse movement of the pawl. The pawl is further configured to disengage from the ratchet once the last detent has been engaged. As the pawl engages each detent, a click is emitted. Based on a manufacturer's specification and/or empirical testing of the tool, the amount of work performed by the tool from the beginning of the test to the last click may be a predetermined amount of work ($W_{spec}$). Thus, when testing this hand crimper, the click sensor 38 is employed to sense clicks and relay measurements to the controller 18. Furthermore, measurements associated with the clicks may be stored to the memory 46 and/or the database 54. Moreover, the click measurements, positional measurements and $F_r$ may be associated with one another. For example, a table of measurements, such as the table 58, may be created prior to or during the method 60 and the various measurements may be stored to an entry in the table of measurements at predetermined increments. It is to be noted, however, in other embodiments, any suitable sensor operable to detect appropriate stimuli may be utilized. For example, if the manufacturer of the tool being tested specifies that handles on this tool are to reach a predetermined angle to one another to consider the task completed, the evaluator 10 may include a sensor configured to sense the angle the handles have to one another and relay measurements to the controller 18.

In an embodiment of the invention, it is determined if the tool 12 is in the concluding conformation, at step 76. For example, a stroke length of the actuator 14 may be configured to substantially coincide with the full range of motion for the members 30 and 32 of the tool 12. In another example, the actuator 14 may continue to be modulated until the rests 24 and 26 are in contact. In response to determining the tool 12 has not reached the concluding conformation, the actuator 14 may be further modulated at step 68. In response to determining the tool 12 is in the concluding conformation, the last click may be determined at step 78. Additionally, it is to be noted that the concluding conformation and the last click do not, necessarily, coincide. For example, each handle of a hand tool may have a proximal end connected to a body of the hand tool and a distal end. The distal ends of the handles may have a linear travel of approximately 12 cm of separation to about 0 cm of separation. However, the last click may occur at about 3 cm of separation. Thus, in the example provided, the concluding conformation is 0 cm while the last click occurs at about 3 cm.

It is to be noted, however, in other embodiments, any suitable sensor operable to detect appropriate stimuli may be utilized. As this stimuli or indicator may depend upon the tool being tested, in various embodiments, appropriate indicators may be sensed. For example, to test a tool having a green indicator light that lights in response to completion of a task, the evaluator 10 may include a photo detector configured to sense the appropriate frequency of light and relay measurements to the controller 18. In this regard, it is within the scope of the invention that the modulation of the actuator 14 is stopped essentially at the last click. For example, if there are 12 detents, the number of clicks may be counted and the modulation of the actuator 14 may be stopped following the $12^{th}$ click. In another example, if the linear distance between the members 30 and 32 may not substantially increase until the last detent has been engaged, the evaluator 10 may be configured to pull upon the member 30 and/or 32 following each click or after a predetermined amount of linear travel. If this pull results in a separation of the member 30 from the member 32, it may be determined the last click has occurred. Therefore, the following step 78 is optional, in as much as the modulation of the tool may be stopped at the completion of the task or the last click in the particular example presented.

At step 78, measurements sensed at the completion of the task are identified. For example, the last click may be identified. In order to facilitate identifying the last click, it may be preferable at steps 68–76, to modulate the tool 12 essentially through the full range of motion for the members 30 and 32 of the tool 12. The controller 18, accessing the table 58, may parse through the sensed clicks and identify the last click sensed. The entry having this last click may be flagged and, at step 80, this entry may be utilized to determine one or more values, such as the amount of work performed by the tool 12 from the beginning of the method 60 until the last click.

At step 80, the test data is utilized to determine one or more values. These values may include, for example: force at last click; amount of work to last click; and/or the like. In a specific example, to determine the amount of work to last click, the measurements sensed from the initiation of the test up to and including the last click are accessed by the controller 18 and an amount of work ($W_{test}$) applied to and/or performed by the tool 12 from initiation of the test to the last click may be determined.

At step 82, the test data and/or at least one value determined based on the test data is compared to the specification provided by the manufacturer or determined empirically. For example, the $W_{test}$ may be compared to the $W_{spec}$. If the $W_{test}$ is less than the $W_{spec}$, it may be determined that the tool 12 has failed the evaluation and, at step 84, an indicator that the tool 12 has failed the evaluation may be displayed on the display 48. In addition, the table 58 may be updated to indicate the tool 12 having ID 42 has failed the evaluation. Furthermore, the date and time of the failure may be stored to the table 58. If the $W_{test}$ is greater or equal to the $W_{spec}$, it may be determined that the tool 12 has passed the evaluation and, at step 86, an indicator that the tool 12 has passed the evaluation may be displayed on the display 48. In addition, the table 58 may be updated to indicate the tool 12 having ID 42 has passed the evaluation. Furthermore, the date and time of the passing evaluation may be stored to the table 58. Following the steps 84 or 86, the TES 44 may idle until initiation of another tool 12 evaluation.

Figure 4:
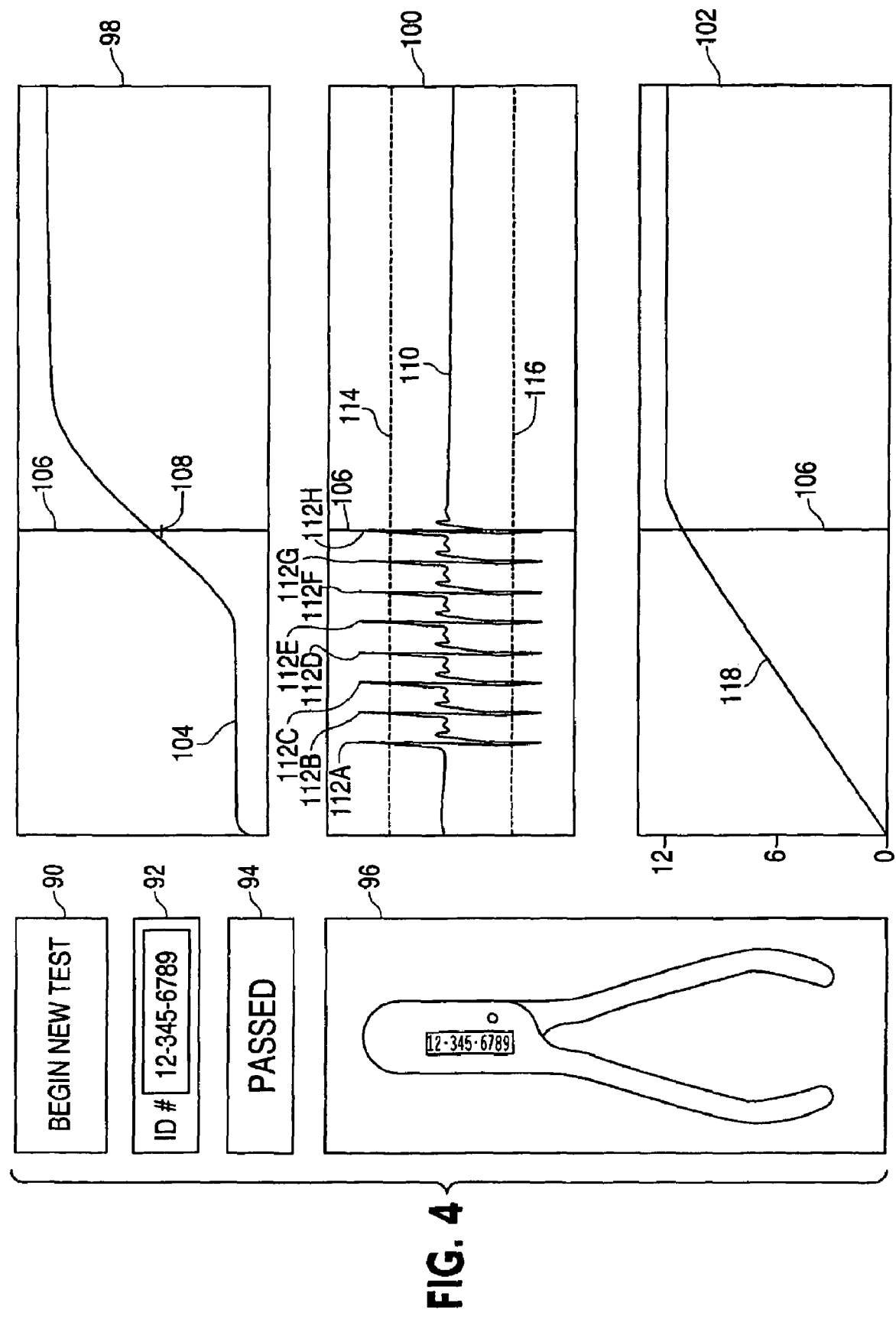
FIG. 4 is an illustration of a screen capture according to an embodiment of the invention.

FIG. 4 is an illustration of a screen capture 88 according to an embodiment of the invention. As shown in FIG. 4, the screen capture 88 for the TES 44 includes a start icon 90, ID box 92, pass/fail box 94, image box 96, force box 98, click box 100, and position box 102. The start icon 90 may provide a user the capacity to initiate testing of the tool 12. The ID box 92 may provide the user the capacity to type in an ID for the tool 12 or, more preferably, display the ID 42 scanned in with the scanner 40. The pass/fail box 94 is configured to display the results of the test. The image box 96 may provide the user the capacity to visually identify the tool 12.

The force box 98 is configured to provide a graph or other visual representation of the force of resistance by the tool 12 during the method 60 or during testing of the tool 12. For example, a curve 104 is illustrated to represent the force over time. The force box 98 includes a line 106 configured to mark a corresponding point along the curve 104 at which the last click occurred. A tick 108 on the line 106 represents the $W_{spec}$.

The click box 100 is configured to provide a graph or other visual representation of sound or vibration sensed during the test. For example, a wave form 110 is illustrated to represent sound sensed during the test. The wave form 110 includes a plurality of spikes 112a–112h. In general, the spikes 112a–112h may be determined based on where the wave form 110 exceeds a threshold value. This threshold value is represented by lines 114 and 116. It is to be noted that line 106 and spike 112h essentially co-inside as a result of the determination that spike 112h represents the last click.

The position box 102 is configured to provide a graph or other visual representation of the linear position of the member 30 during the method 60 or during testing of the tool 12. For example, a curve 118 is illustrated to represent the linear position. The position box 102 includes the line 106 configured to mark a corresponding point along the curve 118 at which the last click occurred.

Figure 5:
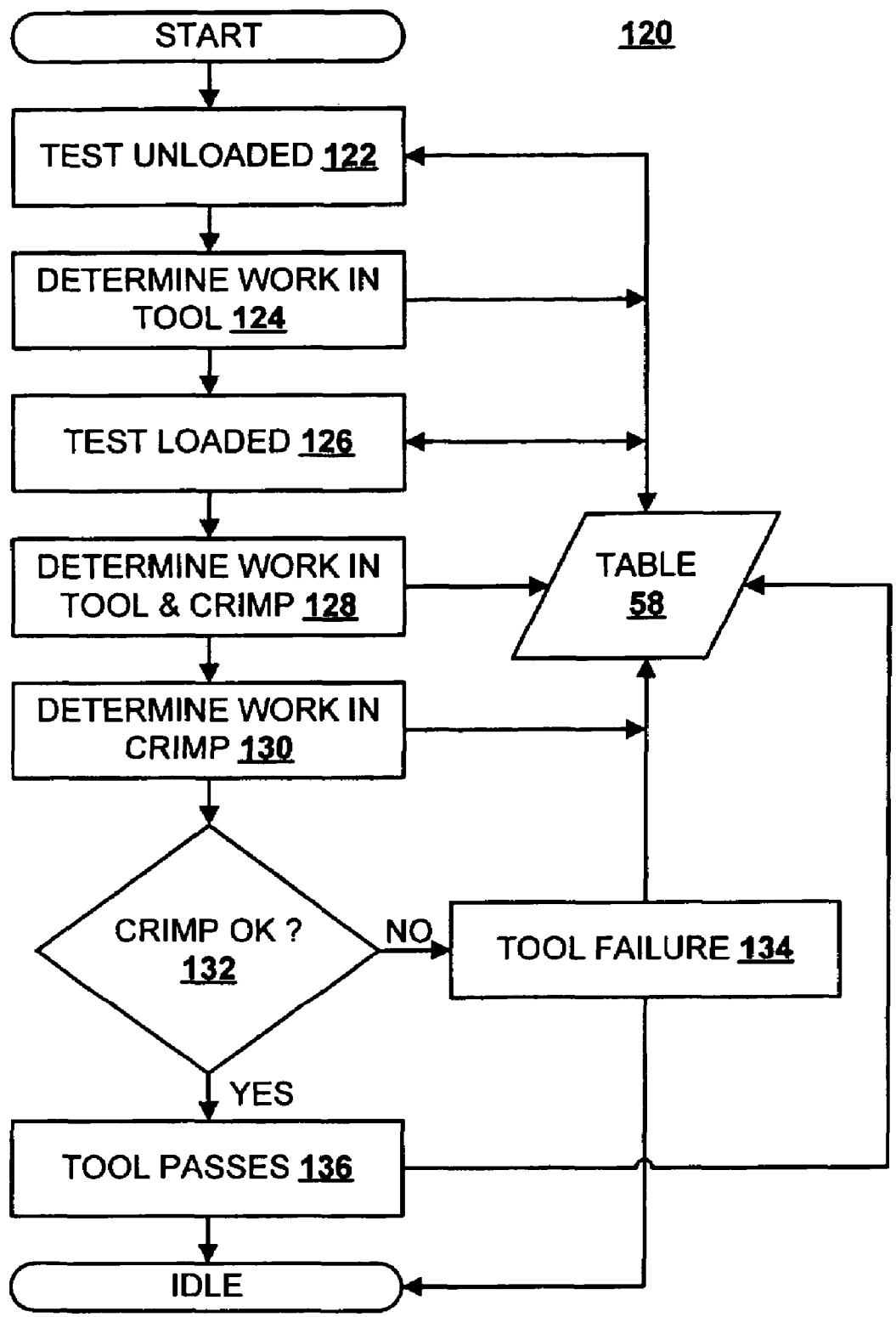
FIG. 5 is a flowchart according to another embodiment of the invention.

FIG. 5 is a flowchart of a method 120 according to another embodiment of the invention. The method 120 is similar to the method 60 and thus, for the sake of brevity, those steps described in the method 60 will not be described again with respect to the method 120.

At step 122, the test according to the method 60 is performed. This test is performed while the tool 12 is essentially unloaded. For example, a crimper is evaluated in a manner similar to that described in steps 64 to 80 without placing a wire and connector in the crimper. In this manner, an amount of work into the tool 12 may be determined at step 124. In addition, the work determined and a time stamp may be stored to the table 58.

At step 126, the test according to the method 60 is performed while the tool 12 is loaded. For example, the connector and wire may be placed in the crimper and, as a result of the modulations performed on the tool 12 in the test performed in a manner similar to that described in steps 64 to 80, the connector may be crimped on to the wire. Additionally, at step 128, the amount of work into the tool 12 while loaded may be determined. This work while loaded and a time stamp may further be stored to the table 58.

At step 130, the work into the function performed by the tool 12 may be determined in any suitable manner based on the amount of work into the tool 12 and the amount of work into the tool 12 while the tool 12 is loaded. For example, the amount of work into the tool 12 may be subtracted from the amount of work into the tool 12 while the tool 12 is loaded. In this manner, the work into the function performed by the tool 12 is essentially determined. For example, an amount of work ($W_{crimp}$) into materially deforming the connector on to the wire may be determined. Additionally, the $W_{crimp}$ and a time stamp may be stored to the table 58.

At step 132, the function performed by the tool 12 may be evaluated. This evaluation may be performed in a variety of ways. For example, the crimp made by the tool 12 at step 126 may be subjected to stressors such as temperature fluctuations, vibrations, other mechanical forces, as well as chemical stressors. In this manner, it may be empirically determined what amount of work into a crimp facilitates an acceptable crimp. In addition, a work into crimp threshold ($W_{crimp\ threshold}$) may be determined based on the empirically determined amount of work into the crimp that facilitates an acceptable crimp. In this regard, another manner of evaluating the function performed by the tool 12 may include comparing the $W_{crimp}$ to the $W_{crimp\ threshold}$. Regardless of the manner of evaluation, if it is determined that the function performed by the tool is not acceptable, it may be determined that the tool 12 has failed the evaluation and, at step 134, an indicator that the tool 12 has failed the evaluation may be displayed on the display 48. In addition, the table 58 may be updated to indicate the tool 12 having ID 42 has failed the evaluation. Furthermore, the date and time of the failure may be stored to the table 58. If it is determined that the function performed by the tool is acceptable, it may be determined that the tool 12 has passed the evaluation and, at step 136, an indicator that the tool 12 has passed the evaluation may be displayed on the display 48. In addition, the table 58 may be updated to indicate the tool 12 having ID 42 has passed the evaluation. Furthermore, the date and time of the passing evaluation may be stored to the table 58. Following the steps 134 or 136, the TES 44 may idle until initiation of another tool 12 evaluation. Moreover, it is to be noted that the order that the steps are performed in the method 120 are not critical and may, as suitable, be performed in any reasonable manner. For example, the steps 126 and 128 may be performed prior to the steps 122 and 124.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of evaluating a tool in response to a member of the tool being moved from a first position to a second position, the method comprising:

applying a first force to the member, the first force being operable to move the member from the first position to the second position;

sensing a second force, the second force resulting from a resistance of the tool to the first force; and determining whether the second force exceeds a predetermined value;

determining an event occurrence;

determining whether the second force exceeds the predetermined value in response to the event occurrence;

calculating an amount of work applied to the tool in response to the event occurrence, wherein the amount of work is calculated based on the second force and a distance between the first position and a position of the member when the event occurs;

advancing a pawl along a plurality of detents of a ratcheting mechanism of the tool as a result of moving the member from the first position to the second position;

determining whether the pawl has advanced to a final detent of the plurality of detents, wherein the event occurrence is determined in response to the pawl having advanced to the final detent; and determining whether an amount of work applied to the tool exceeds a predetermined work value in response to the event occurrence; and determining the tool passes evaluation in response to the amount of work applied to the tool exceeding the predetermined work value.

2. The method according to claim 1, further comprising sensing vibration emitted from the tool in order to determine whether the pawl has advanced to the final detent.

3. The method according to claim 1, further comprising storing measurements associated with the tool to a table.

4. The method according to claim 3, further comprising sensing an identity of the tool and accessing the table associated with the identity.

5. The method according the claim 4, further comprising generating the table in response to sensing the identity for a first time.

6. The method according to claim 3, further comprising extrapolating a performance trend of the tool in response to the table.

7. A method of evaluating a tool in response to a member of the tool being moved from a first position to a second position, the method comprising:

applying a first force to the member, the first force being operable to move the member from the first position to the second position;

sensing a second force, the second force resulting from a resistance of the tool to the first force; and determining whether the second force exceeds a predetermined value;

advancing a pawl along a plurality of detents of a ratcheting mechanism of the tool as a result of moving the member from the first position to the second position;

determining whether the pawl has advanced to a final detent of the plurality of detents, wherein the event occurrence is determined in response to the pawl having advanced to the final detent; and determining whether an amount of work applied to the tool exceeds a predetermined work value in response to the event occurrence, wherein the amount of work is calculated based upon the second force and a distance between the first position and a position of the member when the pawl has advanced to the final detent; and determining that the tool passes in response to the amount of work applied to the tool exceeding the predetermined work value.

8. The method according to claim 7, further comprising sensing vibration emitted from the tool in order to determine whether the pawl has advanced to the final detent.

* * * * *